(12) United States Patent
Stolarik et al.

(10) Patent No.: US 8,486,264 B2
(45) Date of Patent: Jul. 16, 2013

(54) HOUSING FOR REVERSE OSMOSIS FILTER CARTRIDGE AND METHOD OF FORMING SAME

(71) Applicant: Enpress LLC, Eastlake, OH (US)

(72) Inventors: Douglas S. Stolarik, Mentor, OH (US); Douglas M. Horner, Gates Mills, OH (US); Michael P. Mormino, Auroa, OH (US); Robert John Pristas, Chardon, OH (US)

(73) Assignee: Enpress, LLC, Eastlake, OH (US)

( * ) Notice: Subject to any disclaimer, the term of this patent is extended or adjusted under 35 U.S.C. 154(b) by 0 days.

(21) Appl. No.: 13/742,993

(22) Filed: Jan. 16, 2013

(65) Prior Publication Data

US 2013/0126422 A1    May 23, 2013

Related U.S. Application Data

(62) Division of application No. 12/703,464, filed on Feb. 10, 2010, now Pat. No. 8,377,298.

(51) Int. Cl.
*B01D 27/08* (2006.01)
*B01D 63/06* (2006.01)

(52) U.S. Cl.
USPC ............ 210/232; 210/321.6; 210/321.72; 210/450; 210/451; 210/457; 210/485

(58) Field of Classification Search
USPC ........... 210/232, 321.6, 321.72, 450, 451, 210/455, 457, 485; 156/73.5, 169
See application file for complete search history.

(56) References Cited

U.S. PATENT DOCUMENTS

| | | | |
|---|---|---|---|
| 5,595,651 A | 1/1997 | Pavel | |
| 5,720,411 A | 2/1998 | Darby et al. | |
| 5,866,001 A | 2/1999 | Hlebovy | |
| 6,165,303 A | 12/2000 | Darby et al. | |
| 7,017,771 B1 | 3/2006 | Kothera et al. | |
| 2008/0093367 A1 | 4/2008 | Gilbertson et al. | |

FOREIGN PATENT DOCUMENTS

WO    2008/036901    3/2008

*Primary Examiner* — John Kim
(74) *Attorney, Agent, or Firm* — Rankin, Hill & Clark LLP

(57) ABSTRACT

Housings for reverse osmosis filter cartridges and methods of making the same. The housings include: (1) a hollow cylindrical liner formed of a thermoplastic polymer that is adapted to surround a reverse osmosis filter cartridge; (2) a hollow head assembly that includes a transition collar portion formed of a thermoplastic polymer that is joined to said liner and a barrel portion formed of a chopped glass fiber-filled polymer that is overmolded onto said transition collar portion; (3) an end plug that is adapted to be received within an opening in the barrel portion; and (4) an overwrap layer comprising wound glass filaments and a polymeric resin that covers the outer surfaces of the liner and head assembly.

20 Claims, 5 Drawing Sheets

HOUSING FOR REVERSE OSMOSIS FILTER CARTRIDGE AND METHOD OF FORMING SAME

This application is a division of U.S. patent application Ser. No. 12/703,464 filed Feb. 10, 2010, now U.S. Pat. No. 8,377, 298.

BACKGROUND OF INVENTION

1. Field of Invention

The present invention relates to housings for reverse osmosis filter cartridges and methods for manufacturing the same.

2. Description of Related Art

Reverse osmosis filtration is well known. A solution comprising a solvent and at least one solute is directed toward a semi-permeable membrane at a pressure that is greater than an osmotic pressure. This causes the solvent in the solution, but not the solute, to permeate through the semi-permeable membrane, leaving behind a concentrate.

Conventional reverse osmosis filtration assemblies (e.g., for use in filtering water) include a reverse osmosis filter cartridge, which is contained within a housing. Reverse osmosis filter cartridges for use in such applications typically comprise an elongate, cylindrical, spirally wound semi-permeable membrane. In the case of water filtration, an aqueous solution (e.g., sea water) is directed toward the outer wall of the cylindrical semipermeable membrane. Water permeates through the semipermeable membrane and find its way to an inner flow chamber, which is in fluid communication with a permeate output port. The partially de-watered residual portion of the solution that does not pass through the semipermeable membrane to the inner flow chamber is referred to as a concentrate, and is typically discharged from the housing through either a concentrate output port formed in an end cap that retains the reverse osmosis filter cartridge within the housing or through a side port formed in the housing.

The housing containing the reverse osmosis filter cartridge must be capable of withstanding the substantial internal pressures necessary to force solvent from the solution through the semipermeable membrane. Conventionally, such housings have been formed of steel, which is both expensive and heavy, or of composite glass fiber-reinforced plastics. One example of the latter type of housing is disclosed in Hlebovy, U.S. Pat. No. 5,866,001.

The reverse osmosis filter cartridge housing disclosed in Hlebovy is likely lighter in weight than a conventional steel reverse osmosis filter cartridge housing, but it suffers from other drawbacks such as manufacturing complexity and difficulties in readily customizing the product for a variety of different end use applications.

BRIEF SUMMARY OF THE INVENTION

The present invention provides a housing for a reverse osmosis filter cartridge and a method for manufacturing the same. A housing according to the invention comprises a hollow cylindrical liner formed of a thermoplastic polymer. The liner has an inner surface for surrounding at least a portion of the reverse osmosis filter cartridge, an outer surface and a first open end. The housing further comprises a hollow head assembly. The head assembly comprises a collar portion formed of a thermoplastic polymer and a barrel portion formed of a fiber-reinforced polymer, which has been overmolded onto the collar portion so as to at least partially cover the outer side of the collar portion. A connecting portion of the collar portion is joined to the liner at the first open end (e.g., by spin welding). The housing further comprises an end plug, which is adapted to be received within an opening in the barrel portion opposite the collar portion. The housing further comprises an overwrap layer comprising wound filaments and a polymeric resin, which covers the outer surface of the liner and the outer side of the head assembly.

In a preferred embodiment of the invention, the outer side of the barrel portion of the head assembly includes an annular first bulge, which includes a tapered side portion proximal to the opening in said barrel portion. The overwrap layer covers the tapered side portion of said first bulge. The overwrap layer thus provides additional reinforcement that helps retain the head assembly to the liner.

A housing according to the invention can be manufactured using a relatively simple manufacturing process. It is light in weight and very strong. Furthermore, a housing according to the invention can be customized rapidly, easily and without significant expense.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

These and other features of the invention will be explained with references to the appended figures, where.

DETAILED DESCRIPTION OF THE INVENTION

Figure 1:
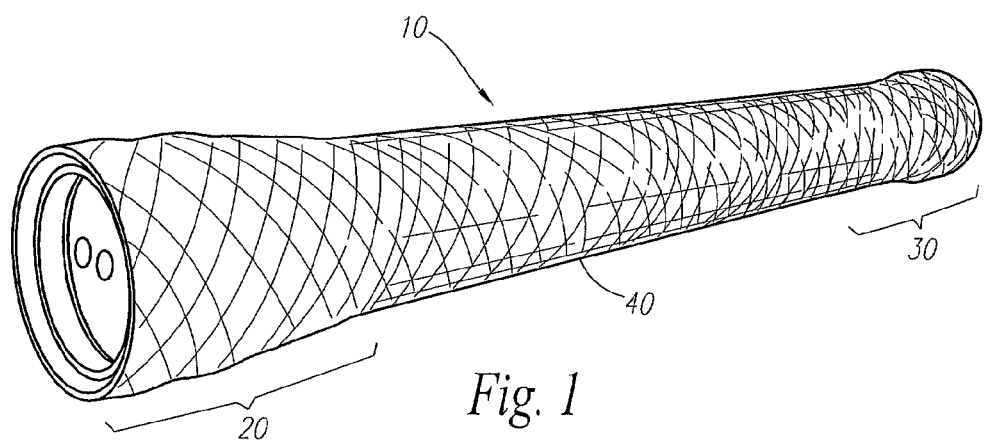
FIG. 1 is a perspective view of an exemplary first embodiment of a housing according to the invention within which is contained a reverse osmosis filter cartridge.
Figure 2:
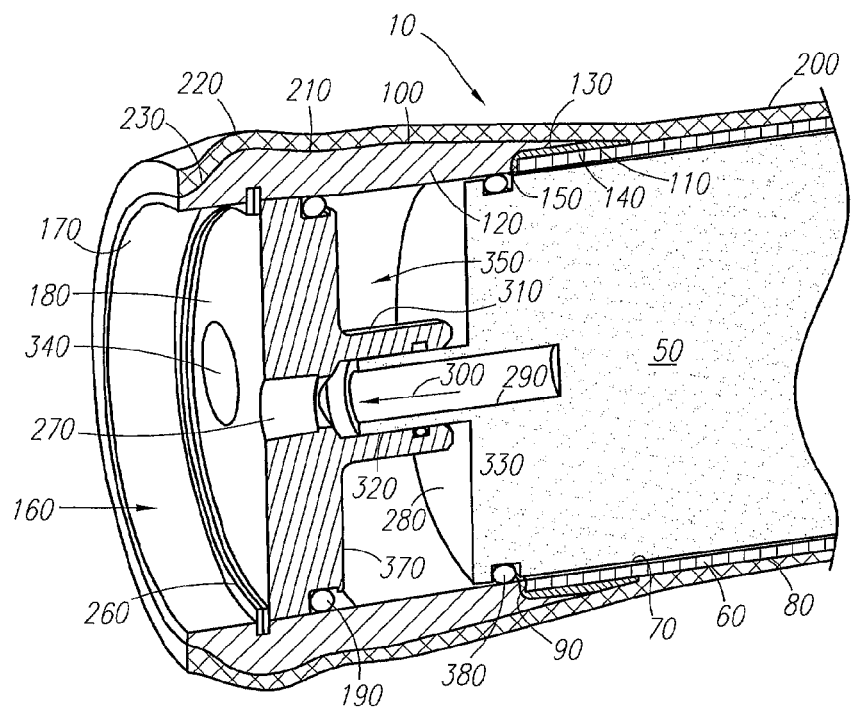
FIG. 2 is a perspective view of a section taken through the longitudinal axis of a portion of the housing and reverse osmosis filter cartridge shown in FIG. 1.

FIG. 1 is a perspective view of an exemplary first embodiment of a housing 10 according to the invention. The housing 10 includes two end portions 20, 30 and an intermediate portion 40. The housing 10 is typically elongate, hollow and cylindrical, and is thus adapted to receive and contain a conventional reverse osmosis filter cartridge 50, a portion of which is shown in FIG. 2. As noted above, reverse osmosis filter cartridges are typically elongate and cylindrical, and are formed of a spirally wound semi-permeable membrane.

The housing 10 comprises a hollow cylindrical liner 60 formed of a thermoplastic polymer. The liner 60 includes an inner surface 70 for surrounding at least a portion of the reverse osmosis filter cartridge 50, an outer surface 80 and a first open end 90. The liner 60 is preferably formed of polypropylene or other olefinic thermoplastic polymer or copolymer. Preferably, no fibers or other reinforcing fillers are present in the liner 60.

The housing 10 further comprises a hollow head assembly 100. The head assembly 100 includes a collar portion 110 formed of a thermoplastic polymer and a barrel portion 120 formed of a fiber-reinforced polymer. The collar portion 110 is preferably formed of polypropylene or other olefinic thermoplastic polymer or copolymer that will readily bond with the liner 60 (e.g., by spin-welding or hot plate welding). The barrel portion 120 is preferably formed of a fiber-reinforced polymer, which need not be thermoplastic. In the preferred embodiment of the invention, the barrel portion 120 is formed of a glass-fiber filled olefinic polymer or copolymer (e.g., polypropylene). The head assembly 100 can be formed by overmolding the barrel portion 120 onto collar portion 110 such that the barrel portion 120 at least partially covers an outer side 130 of said collar portion 110. The term "overmolded" as used in the specification and in the appended claims means that the barrel portion 120 has been bonded to the collar portion 110 by a molding process in which a molten polymer used to form one of the barrel portion 120 or the collar portion 110 is injected into a mold containing the other of the barrel portion 120 or the collar portion 110 (or a precursor thereof). Furthermore, as is discussed in greater detail below, it is also possible to overmold a thermoplastic precursor with a fiber-reinforced polymer (or vice versa) to form a blank, and then remove material from the blank to form the head assembly.

The collar portion 110 includes a connecting portion 140 that is joined to the liner 60 at the first open end 90. This joint is preferably formed by spin-welding, where one of the head assembly 100 and the liner 60 is rapidly rotated relative to the other while the connecting portion 140 of the collar portion 110 is in contact with the liner 60 for a brief period of time. Friction between the contacting surfaces creates heat, which melts the thermoplastic at the point of contact. When the molten thermoplastic cools, it permanently bonds the connecting portion 140 of the collar portion 110 to the liner 60. In the preferred embodiment of the invention, the connecting portion 140 of the collar portion 110 is joined to both the outer surface 80 of the liner 60 proximal to the first open end 90 and also to an end face 150 of the thermoplastic liner 60 at the first open end 90.

The barrel portion 120 of the head assembly 100 includes an opening 160 on an end 170 opposite said collar portion 120. An end plug 180 is adapted to be received within the opening 160 and to be retained within the head assembly 100. Preferably, an O-ring 190 helps insure a fluid tight seal between the end plug 180 and the head assembly 100.

The housing 10 further comprises an overwrap layer 200, which covers the outer surface 80 of the liner 60 and an outer side 210 of the head assembly 100. The overwrap layer is preferably formed by winding long filaments (e.g., glass or carbon fiber) coated with a polymeric resin (e.g., curable epoxy resin) in a redundant, overlapping pattern. Once cured, the filaments and polymeric resin of the overwrap layer 200 reinforce the liner 60 and head assembly 100, which prevents rupture despite substantial internal pressures within the housing 10 during use.

Preferably, the outer side 210 of said head assembly 100 includes an annular first bulge 220, which includes a tapered side portion 230 proximal to the opening 160 in the barrel portion 120 of the head assembly 100. Furthermore, the overwrap layer 200 preferably covers the tapered side portion 230 of the first bulge 220. Due to this configuration, the filaments in the overwrap layer 200 are able to help retain the head assembly 100 to the liner 60. In the unlikely event of a catastrophic failure of the joint between the connecting portion 140 of the collar portion 110 and the liner 60, the overwrap layer 200 would grip the tapered side portion 230 of the first bulge 220 and thereby prevent the head assembly 100 from separating from the liner 60.

Figure 3:
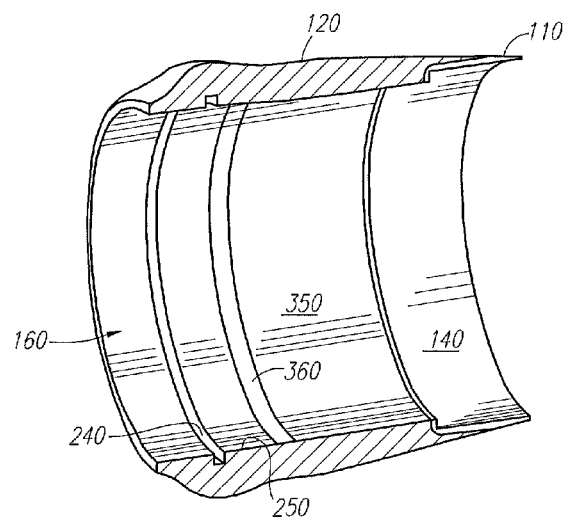
FIG. 3 is a perspective view of the section of the head assembly shown in FIG. 2.

As shown in FIGS. 2 and 3, an annular slot 240 is preferably formed in an inner side 250 of the barrel portion 120 of the head assembly 100 directly opposite the first bulge 220. The slot 240 is adapted to receive a split ring 260, which is adapted to expand outwardly into and be retained within the slot 240. The split ring 260, when retained within the slot 240, provides a circumferential bearing surface that prevents the end plug 180 from being pushed out of the 160 in the barrel portion 120 of the head assembly 100.

The end plug 180 includes a permeate outlet 270 that is adapted to communicate with a permeate flow from an outflow end 280 of the reverse osmosis filter cartridge 50. Typically, the permeate flowing from the outflow end 280 of the reverse osmosis filter cartridge 50 will flow from a hollow center portion 290 in the direction of the arrow 300. The end plug 180 may include a cylindrical female fitting 310, which couples with a male fitting 320 extending from the outflow end 280 of the reverse osmosis filter cartridge 50. The permeate will flow through the mail fitting 320 and out of permeate outlet 270 in the end plug 180. An O-ring 330 can be used to seal the connection between the male fitting 320 and the female fitting 310.

In the embodiment of the invention shown in FIGS. 1 and 2, the end plug 180 preferably further comprises a concentrate outlet 340 that is adapted to communicate with a concentrate flow from the outflow end 280 of the reverse osmosis filter cartridge 50. The concentrate flow typically flows around the perimeter of the filter cartridge 50 such as in the direction shown by arrow 350. It will be appreciated that both the permeate outlet 270 and the concentrate outlet 340 can be threaded. In a preferred embodiment, the permeate outlet 270 is ½" female National Pipe Thread Taper ("NPT"), and the concentrate outlet 340 is ¾" female NPT.

As best shown in FIG. 3, the inner diameter of the head assembly 100 proximal to the opening 160 in the barrel portion 120 is preferably greater than an inner diameter of the liner 60. More preferably, an inner side 350 of the head assembly 100 includes an annular first bevel 360, which provides a transition from the greater diameter to the lesser diameter. The first bevel 360 is preferably intermediate the end plug 180 and the outflow end 280 of the reverse osmosis filter cartridge 50 when the end plug 180 and the reverse osmosis filter cartridge 50 are retained within housing 10. In the embodiment shown in FIG. 2, the first bevel 360 is located just behind a rear side 370 of the end plug 180. The first bevel 360 thus allows the reverse filter cartridge 50 to be inserted into the liner 60 without having to force an O-ring 380 that provides a seal between the filter cartridge 50 and either the inner surface of the liner 70 or the inner side of the head assembly 100 the slot 240. This prevents the O-ring 380 from catching on the slot 240 and being damaged thereby.

Figure 4:
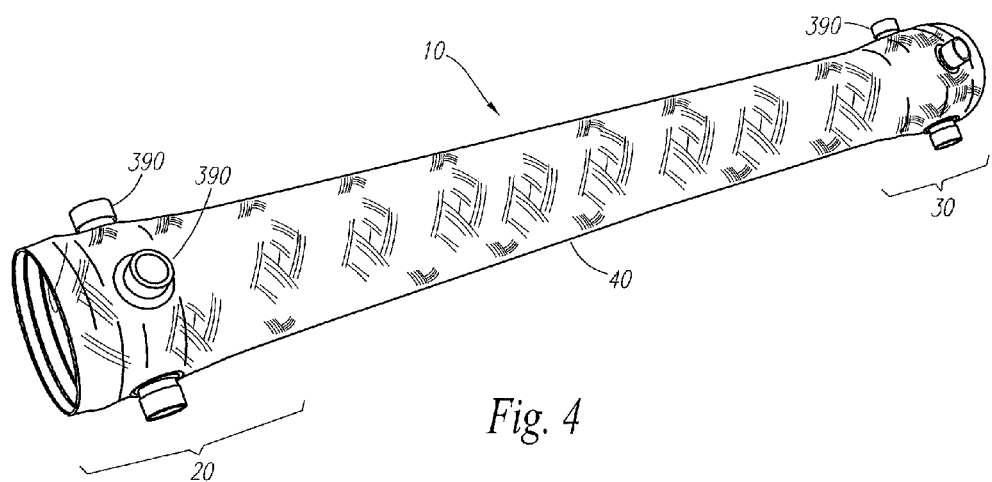
FIG. 4 is a perspective view of an exemplary second embodiment of a housing according to the invention within which is contained a reverse osmosis filter cartridge.
Figure 5:
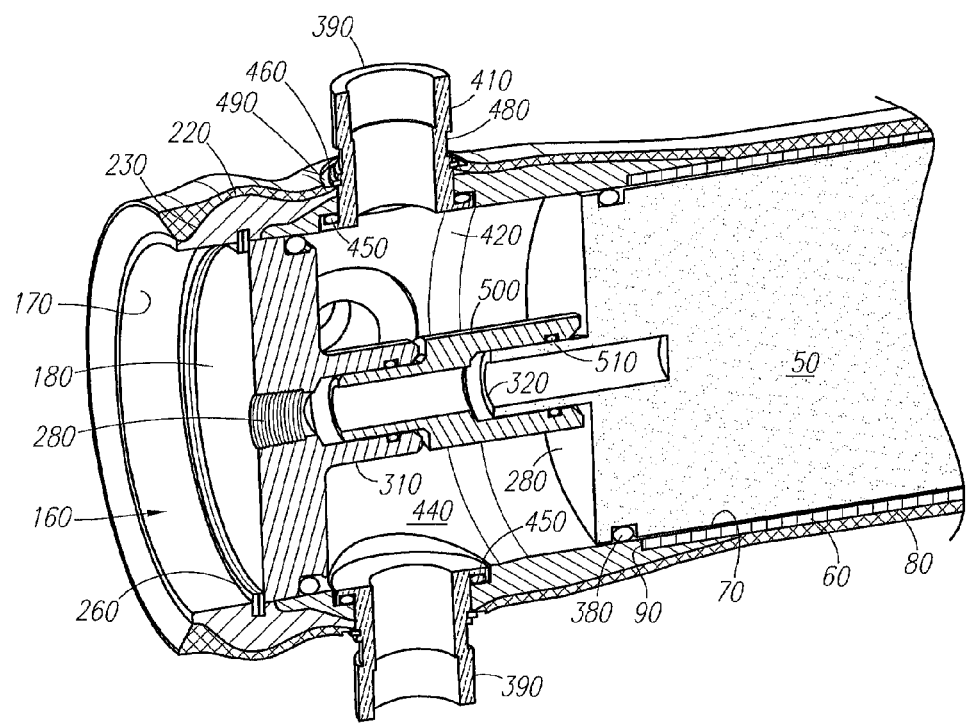
FIG. 5 is a perspective view of a section taken through the longitudinal axis of a portion of the housing and reverse osmosis filter cartridge shown in FIG. 4.

FIG. 4 is a perspective view of an exemplary second embodiment of a housing 10 according to the invention. The housing 10 also includes two end portions 20, 30 and an intermediate portion 40. The housing 10 is also typically elongate, hollow and cylindrical, and is thus adapted to receive and contain a conventional reverse osmosis filter cartridge 50, a portion of which is shown in FIG. 5. The same reference numbers used in FIGS. 1-3 will be used in FIGS. 4-9, where similar structures are shown.

The second embodiment of the invention differs from the first embodiment of the invention in that the housing further comprises one or more side ports 390. On the outflow end of the housing, the side ports 390 can be used as a concentrate outlet, making it unnecessary to include a concentrate outlet 340 in the end cap 180. It will be appreciated that a concentrate outlet 340 could also be provided in the end cap 180, if desired. But this is generally not necessary.

Figure 7:
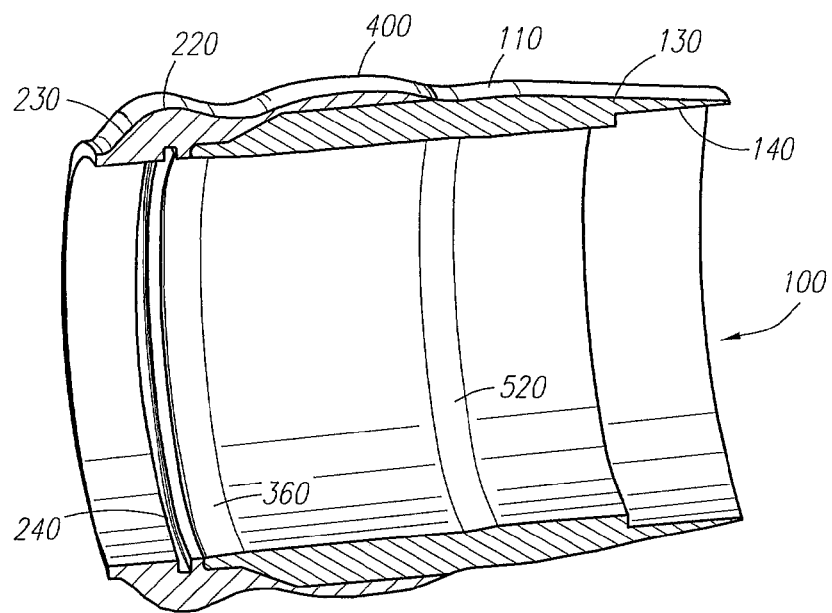
FIG. 7 is a perspective view of the section of the blank shown in FIG. 6 after material has been removed.

Preferably, the outer side 210 of the head assembly 100 includes an annular second bulge 400 (best shown in FIG. 7). The second bulge 400 is preferably located intermediate the first bulge 220 and the liner 60, and the side port 390 extends through the collar portion, the second bulge 400 and the overwrap layer 200. More preferably, the side port 390 also extends through the barrel portion 120 of the head assembly that has been overmolded so as to at least partially cover the outer side 130 of the collar portion 110.

As noted, a plurality of side ports 390 can extend through the collar portion 110, the second bulge 400 and the overwrap layer 200. In the embodiment illustrated in FIG. 4, four side ports 390 are installed in the end portion 20 of the housing 10, and four side ports 390 are installed in the other end portion 30 of the housing 10. Both ends 20, 30 of the housing 10 are substantially identical. As illustrated and explained in this application, the other end portion 30 handles an inflow of a solution (e.g., water to be treated), which flows into the housing 10 through the end ports 390 installed at the other end portion 30. And the end portion 20 handles the outflow of permeate and concentrate, with the permeate flowing out the permeate outlet 270 in the end plug 180 and the concentrate flowing out the side ports 390 installed in the end portion 20. Because the structure of the housing is basically the same on each end 20, 30, description of the outflow end will only be made in this specification, but it would apply to the inflow end as well.

As shown in FIG. 5, each side port 390 preferably comprises a tubular body portion 410 and a flange portion 420. The tubular body portion 410 extends through the collar portion 110, the second bulge 400 in the outer side 210 of the head assembly 100 and the overwrap layer 200. Preferably, the tubular body portion 410 also extends through the barrel portion 120 of the head assembly that has been overmolded so as to at least partially cover the outer side 130 of the collar portion 110.

The flange portion 420 engages a seat 430 (see FIG. 9) provided in an inner side 440 of the collar portion 110. A preferred method of forming the seat 430 is described in detail below. Preferably, an O-ring 450 is captured between the flange portion 420 and the seat 430 to ensure a fluid tight seal between the components. The side ports 390 can be formed of metal (e.g., stainless steel), and can be retained to the housing by means of retaining clips 460, which are retained in grooves 470 formed in the outer side 480 of the tubular body portion 410 of the side ports 390. The retaining clips 460 bear against the lands 490 surrounding the outer side 480 of the tubular body portion 410.

It will be appreciated that when side ports 390 are used, there needs to be sufficient space beyond the outflow end 280 of the reverse osmosis filter cartridge 50 to create a fluid path to the side ports 390. To facilitate the use of the same filter cartridges 50 used in housings 10 having no side ports (e.g., such as shown in FIG. 2), an adapter 500 can be used. The adapter 500 extends between and maintains a fluid tight seal between the male fitting 320 in the reverse osmosis filter cartridge 50 and the female fitting 310 in the end plug 180. An O-ring 510 can be used to maintain a fluid tight seal between the adapter 500 and the male fitting 320.

Figure 9:
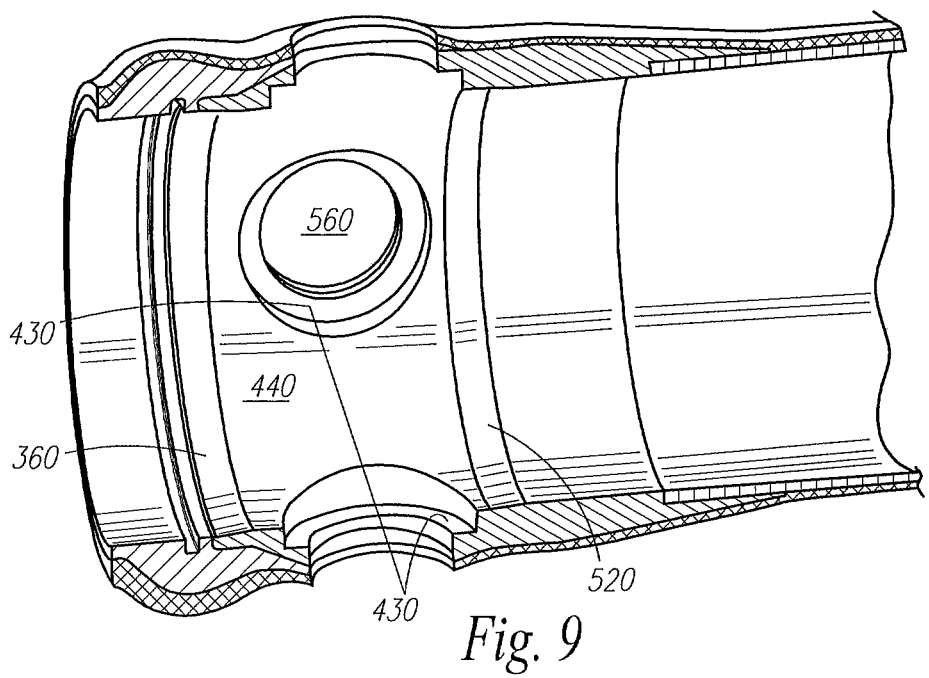
FIG. 9 is a perspective view of a section taken through the longitudinal axis of the housing shown in FIG. 8 after holes and counter bores have been formed therein.

As can best be seen in FIG. 9, when side ports 390 are present in the housing 10, it is also preferably to include both an annular first bevel 360 and an annular second bevel 520. The first bevel 360 is preferably intermediate the end plug 180 and the seat 430 for the side port 390, and the second bevel 520 is preferably intermediate the seat 430 for the side port 390 and the outflow end 280 of the reverse osmosis filter cartridge 50 when said end plug 180 and the reverse osmosis filter cartridge 50 are retained within the housing 10 (see FIG. 5). The annular first bevel 360 and annular second bevel 520 allow one to insert an RO filter cartridge 50 into the housing 10 without damaging the integrity of the O-ring 380 that provides a seal between the filter cartridge 50 and either the inner surface of the liner 70 or the inner side of the head assembly 100. In conventional housings, no bevels are present, and the O-ring 380 can get caught on grooves or other structures used to secure the end cap to the housing.

The present invention also provides a method for manufacturing a housing 10 for a reverse osmosis filter cartridge 50. In accordance with the method, a hollow cylindrical liner 60 formed of a thermoplastic polymer is provided. The liner 60, which can be an extruded thermoplastic pipe cut to a desired length, has an inner surface 70 for surrounding at least a portion of the reverse osmosis filter cartridge 50, an outer surface 80 and a first open end 90. It will be appreciated that the liner will actually have two open ends, with the description set forth in this disclosure with respect to the first open end 90 also being applicable to the other open end.

Also in accordance with the method, a head assembly 100 is provided. As noted above, the head assembly 100 comprises a collar portion 110 formed of a thermoplastic polymer and a barrel portion 120 formed of a fiber-reinforced polymer. The barrel portion 120 is overmolded onto the collar portion 110 so as to at least partially cover the outer side 130 of the collar portion 110. Overmolding is well known, and involves placing one of the thermoplastic collar portion 110 or the barrel portion 120 into a mold cavity and then filling the remaining void space within the mold cavity with the other of the molten fiber-reinforced polymer used to form the barrel portion 120 or the other of the molten thermoplastic polymer used to form the collar portion 110. Contact between the molten polymer and the pre-molded portion results in a very strong bond between the two portions.

Figure 6:
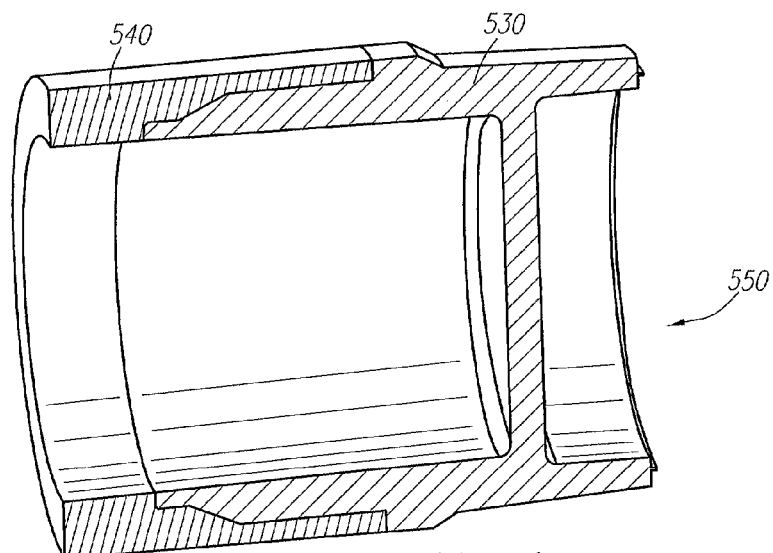
FIG. 6 is a perspective view of a section taken through the longitudinal axis of a blank for forming a head assembly according to the invention.

In embodiments of the invention where no side ports 390 are to be formed in the housing 10, the collar portion 110 can be completely molded or machined prior to being overmolded with the fiber-reinforced polymer used to form the barrel portion 120 (i.e., the complete collar portion 110 is placed into the mold cavity and the molten fiber-reinforced polymer used to form the barrel portion 120 is injected into the mold cavity containing the complete collar portion 110). However, when side ports 390 are to be formed in the housing 10, it is preferable that a preform 540 (see FIG. 6) formed of said fiber-reinforced polymer be overmolded with said polymer 530 to form a blank 550 (i.e., the preform 540 is placed into the mold cavity and the molten polymer used to form the collar portion 110) is injected into the mold cavity containing the preform 540). Material is then removed from the blank 550 (e.g., by machining) to form said head assembly 100. FIG. 6 shows the fiber-reinforced perform 540 overmolded with a polymer 530 to form a blank 550. And FIG. 7 shows head assembly 100 formed by machining the blank 550 shown in FIG. 6.

As noted above, the collar portion 110 includes a connecting portion 140 adapted to be joined to the liner 60 at the first open end 90 and the barrel portion 120 includes an opening 160 on an end 170 opposite the collar portion 110. The connecting portion 140 of the collar portion 110 is joined to the liner 60 at the first open end 90. This can be accomplished by any thermoplastic joining technique (e.g., laser welding, RF welding, hot plate welding, adhesives etc.), but in view of ease and performance is most preferably accomplished by spin-welding. One or both of the head assembly 100 and the liner 60 is rapidly rotated relative to the other while the connecting portion 140 of the collar portion 110 is in contact with the liner 60 for a brief period of time. Friction between the contacting surfaces creates heat, which melts the thermoplastic at the point of contact. When the molten thermoplastic cools, it permanently bonds the connecting portion 140 of the collar portion 110 to the liner 60. In the preferred embodiment of the invention, the connecting portion 140 of the collar portion 110 is joined to both the outer surface 80 of the liner 60 proximal to the first open end 90 and also to an end face 150 of the thermoplastic liner 60 at the first open end 90.

Once the head assembly 100 has been joined to the liner 60, preferably at both ends 20, 30, the overwrap layer 200 comprising wound filaments and polymeric resin is applied. Preferably, long glass filaments and an epoxy resin are used, and the glass filaments are wrapped in an overlapping manner while liner 60 and joined head assemblies 100 are supported on a mandrel. The overwrap layer 200 is applied beyond the opening 160 in the barrel portion of the head assembly 100. This excess is trimmed away, most preferably after the overwrap layer 200 has been fully cured.

Figure 8:
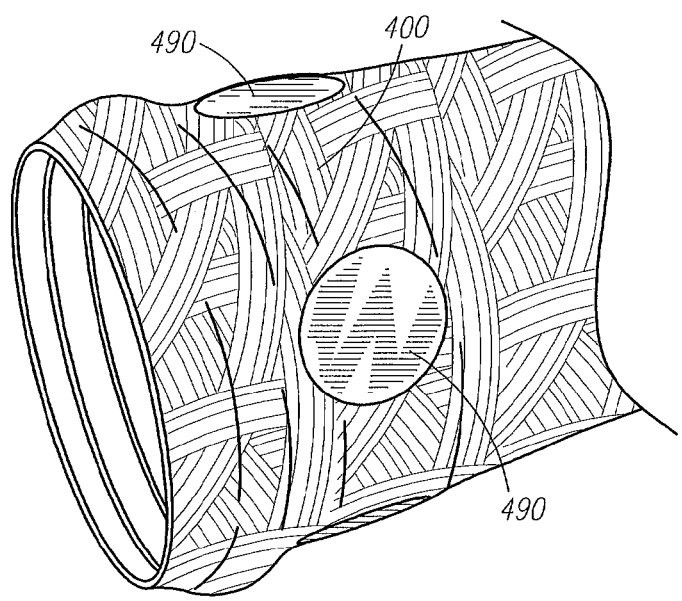
FIG. 8 is a perspective view of a portion of a housing according to the invention after lands have been formed.

To install side ports 390, lands 490 are first formed in the second bulge 400 as shown in FIG. 8. Preferably, the curvature defined by the second bulge 400 is such that when a flat land 490 is formed by grinding, the resulting land defines a circle having a diameter that is slightly larger than that required for passage of the tubular body portion 410 of the side port 390. A hole 560 is bored through the lands 490 from the outside sufficient for the tubular body portion 410 of the side port 390 to pass. A counter bore is formed in an inner side 440 of the collar portion 110 to form a seat 430 for the side port 390, as shown in FIG. 9. The tubular body portion 410 of the side port 390 is pushed through the hole 560 from the inside such that the flange 420 engages the seat 430, preferably with an O-ring 450 captured therebetween. A retaining clip 460 can be used to secure the side port 390 to the head assembly 100.

The method according to the invention provides substantial advantages over prior art methods of forming housings for reverse osmosis filter cartridges. One advantage is the flexibility provided in the number and location of side ports. Because the side ports are installed after the head assembly has been joined to the liner and the overwrap layer has been applied, the side ports can be easily located and aligned relative to each other, as desired. Furthermore, the method provides greater flexibility in that one mold or collar design can be used in multiple applications. Housings formed in accordance with the invention are very strong, yet light in weight.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A housing, comprising:
   a hollow cylindrical liner formed of a thermoplastic polymer, the liner having an inner surface, an outer surface and a first open end;
   a hollow head assembly comprising
      a collar portion formed of a thermoplastic polymer, the collar portion including a connecting portion joined to the liner at the first open end, and
      a barrel portion formed of a fiber-reinforced polymer, the barrel portion being overmolded onto the collar portion so as to at least partially cover the outer side of the collar portion, the barrel portion including an opening on an end opposite the collar portion;
   an end plug adapted to be received within the opening in the barrel portion and to be retained within the head assembly; and
   an overwrap layer comprising wound filaments and a polymeric resin, the overwrap layer covering the outer surface of the liner and an outer side of the head assembly.

2. The housing according to claim 1, wherein the connecting portion of the collar portion is spin-welded to the liner at the first open end.

3. The housing according to claim 1, wherein a side port extends through the overwrap layer and the collar portion.

4. The housing according to claim 3, wherein the side port comprises a tubular body portion and a flange portion, the tubular body portion extends through the collar portion, and
   a counter bore is provided in an inner side of the collar portion to form a seat, and the flange portion of the side port engages the seat.

5. The housing according to claim 4, wherein an O-ring is captured between the flange portion and the seat.

6. The housing according to claim 1, wherein the outer side of the head assembly includes an annular first bulge, the first bulge including a tapered side portion proximal to the opening in the barrel portion, and wherein the overwrap layer covers the tapered side portion of the first bulge.

7. The housing according to claim 6, wherein an annular slot is formed in an inner side of the barrel portion opposite the first bulge, the slot being adapted to receive a split ring for retaining the end plug within the barrel portion.

8. The housing according to claim 1, wherein an inner diameter of the head assembly proximal to the opening in the barrel portion is greater than an inner diameter of the liner.

9. The housing according to claim 8, wherein an inner side of the head assembly includes an annular first bevel.

10. The housing according to claim 6, wherein the outer side of the head assembly includes an annular second bulge, the second bulge being located intermediate the first bulge and the liner.

11. The housing according to claim 1, wherein the liner is formed of an olefinic thermoplastic polymer or copolymer.

12. The housing according to claim 11, wherein no fibers or other reinforcing fillers are present in the liner.

13. The housing according to claim 1, wherein the housing is adapted to house an associated filter cartridge such that the associated filter cartridge is at least partially surrounded by the liner, and
   the end plug includes a permeate outlet that is adapted to communicate with a permeate flow from an outflow end of the associated filter cartridge housed in the housing.

14. The housing according to claim 13, wherein the end plug further includes a concentrate outlet that is adapted to communicate with a concentrate flow from the outflow end of the associated filter cartridge.

15. The housing according to claim 14, wherein an inner diameter of the head assembly proximal to the opening in the barrel portion is greater than an inner diameter of the liner.

16. The housing according to claim 15, wherein an inner side of the head assembly includes an annular first bevel, the first bevel being intermediate the end plug and the outflow end of the associated filter cartridge when the end plug and the associated filter cartridge are retained within the housing.

17. The housing according to claim 10, wherein the housing further a side port extending through the collar portion, the second bulge in the outer side of the barrel portion and the overwrap layer.

18. The housing according to claim 17, wherein a plurality of side ports extend through the collar portion, the second bulge in the outer side of the barrel portion and the overwrap layer.

19. The housing according to claim 17, wherein the side port comprises a tubular body portion and a flange portion, the tubular body portion extends through the collar portion, the second bulge in the outer side of the head assembly and the overwrap layer, and a counter bore is provided in an inner side of the collar portion to form a seat, and the flange portion of the side port engages the seat.

20. The housing according to claim 19, wherein an inner side of the head assembly includes an annular first bevel and an annular second bevel, the first bevel being intermediate the end plug and the seat for the side port and the second bevel being intermediate the seat for the side port and the outflow end of the associated filter cartridge when the end plug the associated filter cartridge are retained within the housing.

* * * * *